(12) United States Patent
Brenner et al.

(10) Patent No.: US 11,495,834 B2
(45) Date of Patent: Nov. 8, 2022

(54) TURNABLE CARRIER FOR ELECTRICAL COMPONENTS OF A BATTERY MODULE

(71) Applicant: Clarios Advanced Solutions GmbH, Hannover (DE)

(72) Inventors: Helge Brenner, Hannover (DE); Markus Hoh, Wunstorf (DE); Ralf Joswig, Buchholz (DE)

(73) Assignee: Clarios Advanced Solutions GmbH, Hannover (DE)

( * ) Notice: Subject to any disclaimer, the term of this patent is extended or adjusted under 35 U.S.C. 154(b) by 328 days.

(21) Appl. No.: 16/081,836

(22) PCT Filed: Mar. 3, 2017

(86) PCT No.: PCT/EP2017/055062
§ 371 (c)(1),
(2) Date: Aug. 31, 2018

(87) PCT Pub. No.: WO2017/149144
PCT Pub. Date: Sep. 8, 2017

(65) Prior Publication Data
US 2019/0081363 A1    Mar. 14, 2019

(30) Foreign Application Priority Data

Mar. 3, 2016 (DE) .................. DE 102016103840.7

(51) Int. Cl.
*H01M 10/42* (2006.01)
*H01M 50/20* (2021.01)
*H01M 50/502* (2021.01)
*B60W 20/13* (2016.01)

(52) U.S. Cl.
CPC ......... *H01M 10/425* (2013.01); *H01M 50/20* (2021.01); *H01M 50/502* (2021.01); *B60W 20/13* (2016.01)

(58) Field of Classification Search
None
See application file for complete search history.

(56) References Cited

U.S. PATENT DOCUMENTS

| | | | |
|---|---|---|---|
| 5,830,598 A | 11/1998 | Patterson | |
| 8,574,747 B2 | 11/2013 | Okada et al. | |
| 8,652,678 B2 | 2/2014 | Musetti | |
| 2011/0104519 A1* | 5/2011 | Ahn | H01M 50/20 429/7 |

(Continued)

FOREIGN PATENT DOCUMENTS

| | | |
|---|---|---|
| CN | 103986038 A | 8/2014 |
| JP | 2009110855 | 5/2009 |
| KR | 20140046227 | 4/2014 |

OTHER PUBLICATIONS

International Search Report and Written Opinion for PCT/EP2017/055062 dated May 15, 2017. 11 pages.

*Primary Examiner* — Haroon S. Sheikh
(74) *Attorney, Agent, or Firm* — Boardman & Clark LLP

(57) ABSTRACT

A battery module includes a carrier configured to receive electrical components. The carrier is electrically insulative and includes a first portion configured to receive a first plurality of electrical components, a second portion configured to receive a second plurality of electrical components, and a flexible region configured to enable the first portion to turn relative to the second portion.

20 Claims, 8 Drawing Sheets

(56) References Cited

U.S. PATENT DOCUMENTS

| | | | |
|---|---|---|---|
| 2013/0224532 A1* | 8/2013 | Bengtsson | H01M 10/615 |
| | | | 429/7 |
| 2013/0258575 A1 | 10/2013 | Rothkopf et al. | |
| 2014/0212732 A1* | 7/2014 | Ichikawa | H01M 2/206 |
| | | | 429/158 |
| 2014/0363711 A1 | 12/2014 | Zhao | |
| 2019/0027720 A1* | 1/2019 | Rejman | H01M 50/284 |

* cited by examiner

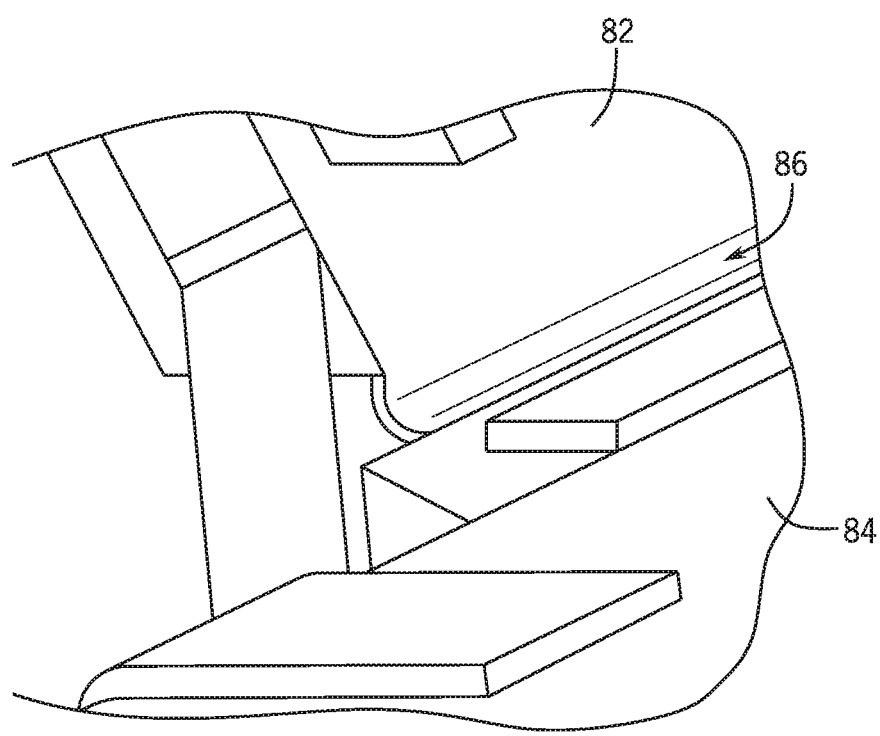
FIG. 7
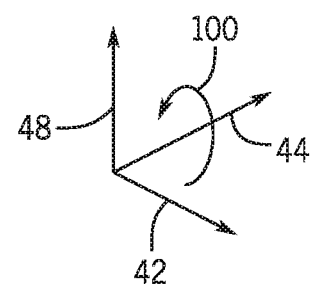

TURNABLE CARRIER FOR ELECTRICAL COMPONENTS OF A BATTERY MODULE

CROSS REFERENCE TO RELATED APPLICATIONS

This application is a National Stage Entry of PCT/EP2017/055062, entitled "TURNABLE CARRIER FOR ELECTRICAL COMPONENTS OF A BATTERY MODULE", filed Mar. 3, 2017, the entirety of which is incorporated herein by reference.

BACKGROUND

The present disclosure relates generally to the field of batteries and battery modules. More specifically, the present disclosure relates to a turnable (e.g., hinged) carrier of electrical components (e.g., electrical coupling components) of a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include electrical components (e.g., electrical connector components such as bus bars) configured to enable or cause electrical connection between other components (e.g., adjacent electrochemical cells). However, poor alignment and/or integration of the electrical components may cause poor electrical coupling of the components to be coupled, which may lead to short circuits. Further, the process of connecting the electrical components with the components to be connected may be cumbersome and inefficient. Accordingly, improved connection of electrical components of a battery module is desired.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module having a carrier configured to receive electrical components. The carrier is electrically insulative and includes a first portion configured to receive a first plurality of electrical components, a second portion configured to receive a second plurality of electrical components, and a flexible region configured to enable the first portion to turn relative to the second portion.

The present disclosure also relates to an electrically insulative carrier of a battery module. The carrier includes a first portion configured to receive first electrical connectors, a second portion configured to receive second electrical connectors, and a hinge portion separating the first portion from the second portion. The hinge portion is configured to enable the first portion to rotate relative to the second portion between an angled orientation and a planar orientation.

The present disclosure also relates to a method of manufacturing a battery module. The method includes disposing first electrical connectors on a first portion of a carrier of the battery module. The method also includes disposing second electrical connectors on a second portion of the carrier, where the second portion of the carrier is joined to the first portion of the carrier by a flexible region of the carrier. The method also includes turning the first portion of the carrier relative to the second portion of the carrier about the flexible region and contacting the first electrical connectors with terminals of electrochemical cells of the battery module.

DRAWINGS

Various aspects of this disclosure may be better understood upon reading the following detailed description and upon reference to the drawings in which:

FIG. 7 is a perspective view of a portion of an embodiment of a flexible region of the carrier of the electrical unit of FIG. 4, in accordance with an aspect of the present disclosure;

DETAILED DESCRIPTION

Figure 1:
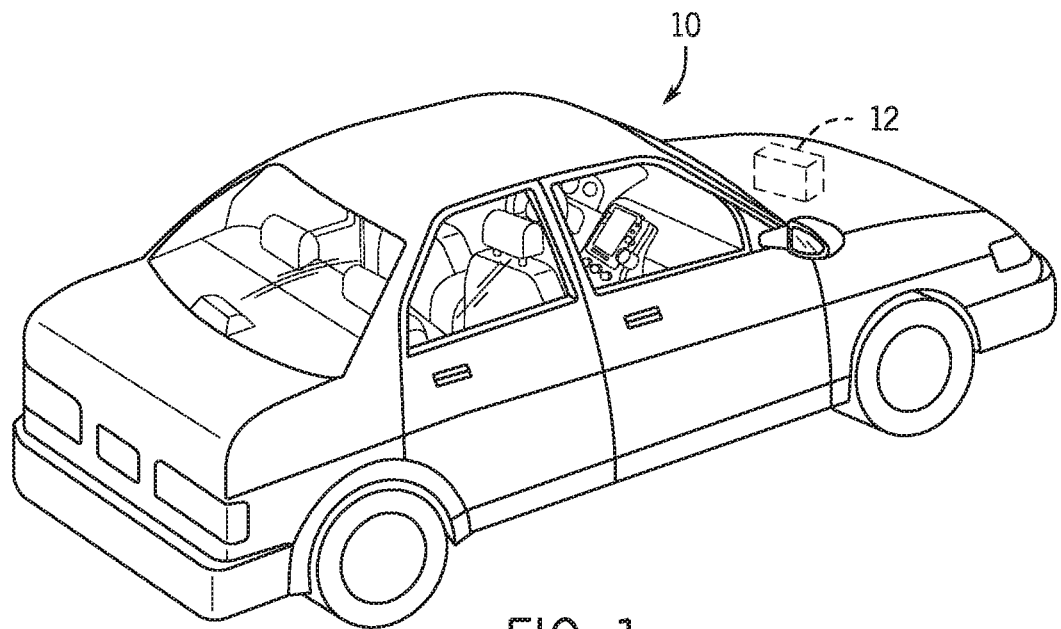
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include electrical components (e.g., electrical connector components such as bus bars) configured to cause electrical connection between other components (e.g., terminals of adjacent electrochemical cells), or configured to otherwise electrically interact with components of the battery module. To facilitate improved electrical connection and assembly, the electrical components (e.g., bus bars) may be mounted onto an electrically non-conductive carrier component (e.g., an integral carrier) that aligns the electrical components with the appropriate components to be connected (e.g., with terminals of various electrochemical cells). However, the appropriate components to be connected may include a wide range of components disposed throughout the battery module and along various faces of the battery module. For example, certain of the electrical components disposed on the carrier may be bus bars, which generally interface with terminals of the electrochemical cells proximate a first face of a housing of the battery module. Certain other electrical components disposed on the carrier may include relay circuit components, which may interface with a printed circuit board (PCB) of the battery module that may be disposed proximate a second face of the housing of the battery module different than the first face of the battery module.

Accordingly, the carrier of the present disclosure may include multiple faces corresponding with multiple faces of the housing of the battery module, or with multiple faces of one or more stacks of electrochemical cells of the battery module. Further, the carrier may be one integral component (e.g., one integral plastic component), such that numerous electrical components are disposed on a single component having multiple faces corresponding with the multiple faces of the housing. In accordance with present embodiments, to facilitate efficient assembly of the integral carrier, the carrier may be hinged or otherwise turnable along an edge or flexible region of the carrier separating two portions of the integral carrier, where the two portions correspond with two different faces (e.g., perpendicular faces) of the final, installed carrier (e.g., integral carrier). Thus, the carrier may be laid flat during assembly of the electrical components onto the carrier. During installation of the carrier into the battery module, the carrier may be maneuvered via the flexible region of the carrier such that the carrier includes portions angled relative to one another, thereby facilitating appropriate positioning of the electrical components disposed on the carrier.

For example, a first portion of the integral carrier may receive various electrical components configured to interface with the PCB of the battery module, while a second portion of the integral carrier may receive various different electrical components configured to interface with terminals of the electrochemical ells of the battery module. During assembly of the integral carrier, the first and second portions may face a substantially same direction, such that all the electrical components may be easily affixed to the first and second portions of the integral carrier from a single location and/or with a single tool. As the integral carrier is installed into the battery module, the integral carrier may be bent along the edge (e.g., hinge) of the integral carrier, such that the first portion of the integral carrier is angled (e.g., perpendicular) to the second portion of the integral carrier.

After bending the integral carrier along the edge (e.g., the hinge), the first portion of the integral carrier may be a first face of the integral carrier and the second portion of the integral carrier may be a second face of the integral carrier (e.g., perpendicular to the first face of the integral carrier). The angled or perpendicular nature of the faces of the integral carrier facilitate accurate location of the electrical components affixed to the integral carrier. For example, the electrical components across the first face of the integral carrier may appropriately interface with components proximate a first face of the housing or stack of electrochemical cells, and the electrical components across the second face of the integral carrier may appropriately interface with components proximate a second face of the housing or stack of electrochemical cells. It should be noted that, in other embodiments, the turnable carrier (e.g., turnable integral carrier) may include more than two portions (e.g., 3, 4, 5, 6, or more portions) corresponding with more than two faces of the final, installed integral carrier. These and other features will be described in detail below with reference to the figures.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
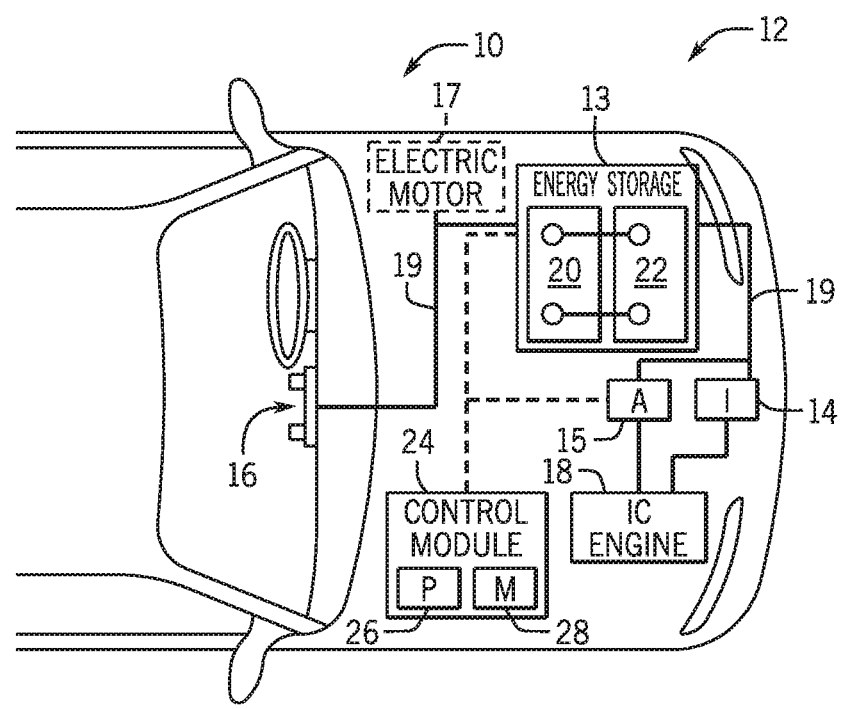
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

In accordance with an aspect of the present disclosure, the battery module 20 (e.g., lithium-ion battery module) may include a carrier configured to receive a number of electrical connectors utilized in operation of the battery module 20. The carrier may be a single, integrally formed carrier that spans a large portion of the battery module 20 such that a number of different types of electrical connectors may be received by (e.g., mounted on) the carrier. In accordance with the present disclosure, the carrier may include flexible regions configured to enable turning or rotation of certain portions of the carrier with respect to other portions of the carrier. Accordingly, the integral carrier may initially be a flat member configured to receive a number of electrical connectors. After assembly of the integral carrier (e.g., after disposing the electrical connectors on the integral carrier), portions of the integral carrier may be folded, turned, rotated, or otherwise maneuvered such that the integral carrier fits into place within the battery module and such that the electrical connectors contact the appropriate components of the battery module, thereby electrically connecting the appropriate components.

Figure 3:
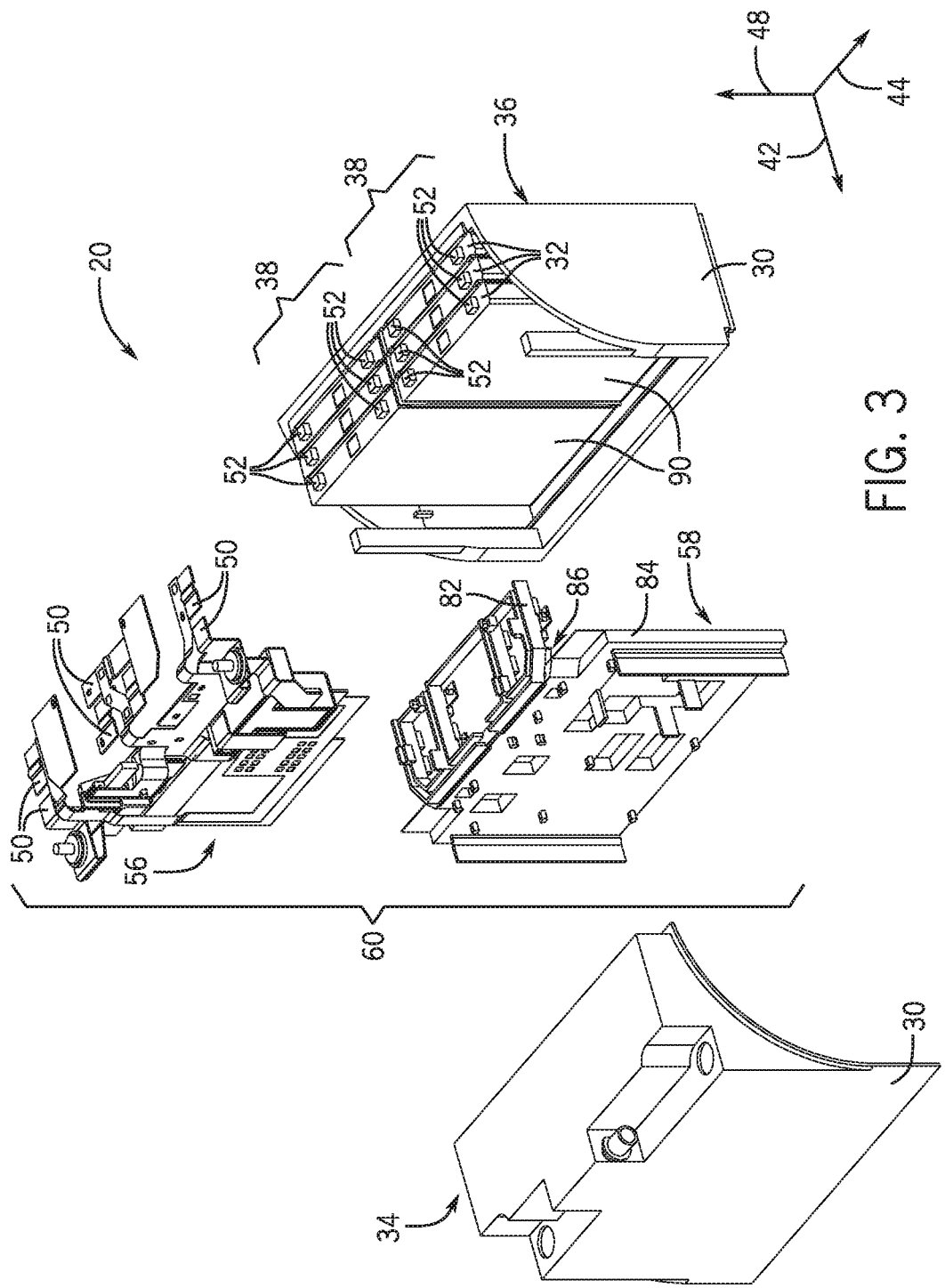
FIG. 3 is an exploded perspective view of an embodiment of a battery module for use in the vehicle of FIG. 2, in accordance with an aspect of the present disclosure.

An exploded perspective view of an embodiment of the battery module 20 (e.g., lithium-ion battery module) of FIG. 2 is shown in FIG. 3. The battery module 20 includes a housing 30 configured to receive a number of electrochemical cells 32. For example, as shown, the housing 30 receives six electrochemical cells 32. However, in another embodiment, the housing 30 may receive 2, 3, 4, 5, 7, 8, 9, 10, 11, 12, or more electrochemical cells 32. Further, the housing 30 in the illustrated embodiment includes an upper cover 34 and a lower base 36. During manufacturing or installation, the base 36 may receive the electrochemical cells 32 and/or other components of the battery module 20, and the cover 34 may be disposed over the base 36 after the electrochemical cells 32 and/or other components are disposed therein.

However, other configurations of the housing 30 may also be possible. For example, the housing 30 may include more than two components (e.g., more than the base 36 and the cover 34). Further, in certain embodiments, the housing 30 may include only a base, and the base may be a prismatic shape configured to be closed by a separate smaller lid. For example, in such embodiments, the base may be a prismatic shape having a closed bottom and side walls extending upwardly from the closed bottom. Smaller sidewalls of the smaller lid may couple to the side walls of the prismatic base, or the smaller lid may be a prismatic wall (e.g., having no sidewalls) that couples to the side walls of the base.

As shown, the electrochemical cells 32 may be disposed in one or more stacks 38 (e.g., where the electrochemical cells 32 are stacked in a first direction 42, and the stacks 38 are disposed side-by-side in a second direction 44 perpendicular to the first direction 42) in the base 36 of the housing 30. By so positioning the electrochemical cells 32 and the corresponding stacks 38, terminals 52 of the electrochemical cells 32 may extend away from the respective electrochemical cells 32 in a single direction (e.g., a third direction 48) and may be disposed in substantially the same plane, area, or volume.

In general, the electrochemical cells 32 are electrically connected with one another (e.g., in series, in parallel, or in a combination thereof) to form an interconnected network of electrochemical cells 32. The interconnected network of electrochemical cells 32 may discharge to supply a charge of the battery module 20 (e.g., to the vehicle) and may recharge to capture and store a charge (e.g., from the vehicle). In order to electrically connect the electrochemical cells 32 together, bus bars 50 (e.g., electrically conductive bars) may be utilized to electrically connect the terminals 52 (e.g., electrically conductive terminals) of adjacent electrochemical cells 32 (e.g., by spanning between, and physically contacting, the terminals 52 of the adjacent electrochemical cells 32). Depending on the configuration, the connection scheme of the bus bars 50, with respect to the battery module 20 as a whole, may differ. For example, if the battery module 20 includes only electrochemical cells 32 disposed in series, the connection scheme of the bus bars 50 may be different than if the battery module 20 includes only electrochemical cells 32 disposed in parallel. The present disclosure is intended to, and capable of, including any suitable bus bar 50 connection scheme, including a 'series' scheme, a 'parallel' scheme, or a scheme having a combination of 'series' and 'parallel' connections.

In accordance with the present disclosure, the bus bars 50 may be one type of "electrical component" utilized to electrically couple "connected components" of the battery module 20, or configured to be utilized to electrically couple "components to be connected" of the battery module 20. For example, the battery module 20 may include a group of electrical components 56 that includes the bus bars 50. The electrical components 56 may also include relay circuitry, a printed circuit board (PCB), flexible circuitry (e.g., which carries temperature/voltage sensors, signal collectors, etc.), battery module terminals (e.g., major terminals) and other components described in detail below with reference to FIG. 4. The electrical components 56 are generally received by (e.g., mounted on) a carrier 58, where the carrier 58 and the electrical components 56 together form an electrical unit 60. The carrier 58 itself may be electrically insulative (e.g., plastic) to prevent short circuits between the electrical components 56 disposed on the carrier 58, and to impart flexibility to the carrier 58, in accordance with the present disclosure. The electrical unit 60 having the carrier 58 and the electrical components 56 mounted thereon will be described in detail below with reference to FIG. 4.

Figure 4:
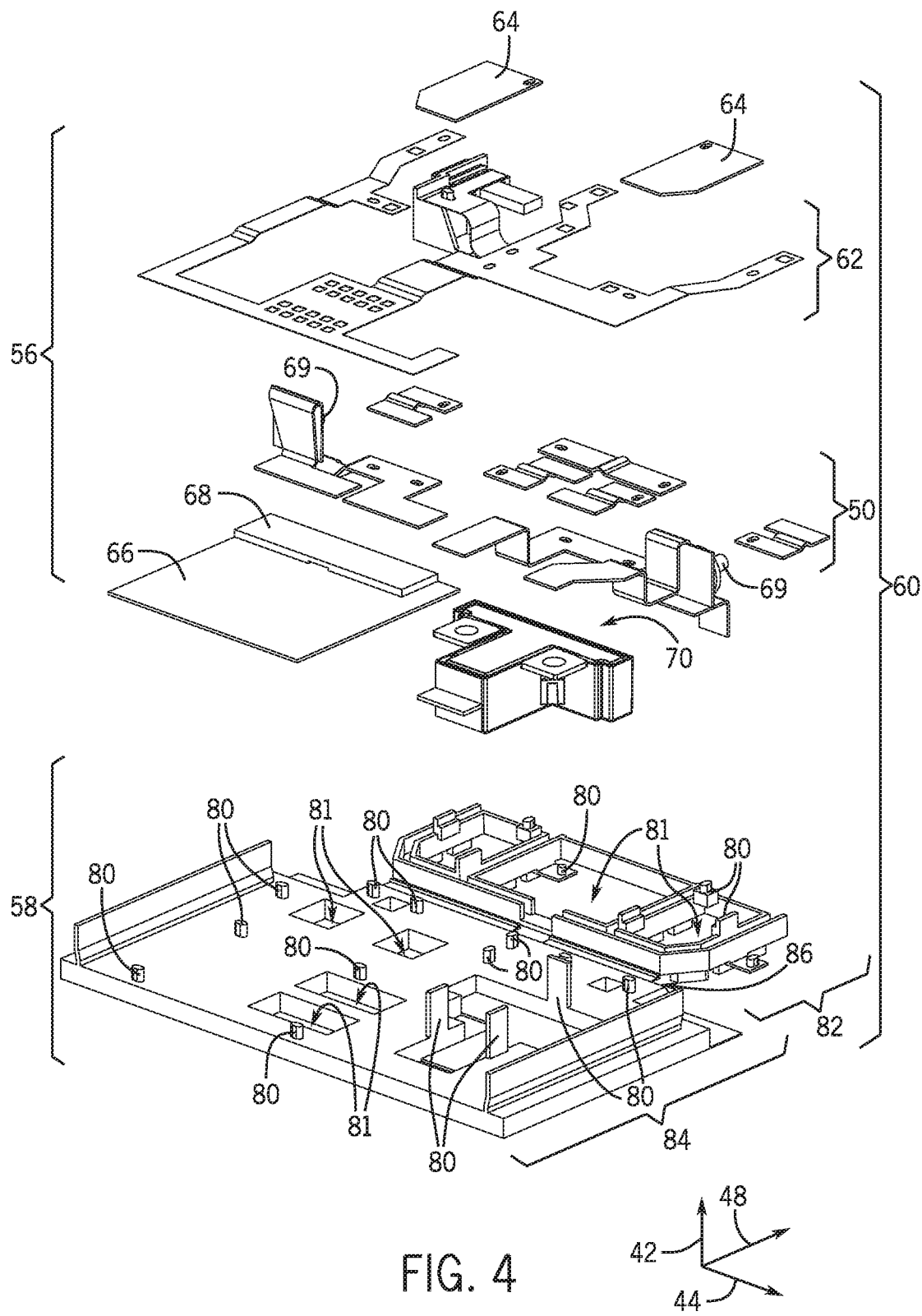
FIG. 4 is an exploded perspective view of an embodiment of an unassembled electrical unit having a carrier and electrical components for use in the battery module of FIG. 3, in accordance with an aspect of the present disclosure.

FIG. 4 is an exploded perspective view of an embodiment of the electrical unit 60 having the carrier 58 and the electrical components 56. As shown, the electrical components 56 include the bus bars 50, flexible circuitry 62, shields 64, a PCB 66, a shunt 68, battery module terminals 69 (e.g., major terminals) and a relay 70. In general, the flexible circuitry 62 may include one or more temperature sensors, one or more voltage sensors, flexible lines extending from the various sensors (e.g, toward the PCB 66), and other components. For example, the flexible circuitry 62 may include a flexible conductive material, or a flexible non-conductive material with conductive wires embedded therein. The flexible circuitry 62 may include the sensors mentioned above coupled with the flexible circuitry 62 material, or embedded within the flexible circuitry 62 material. Further, sensors and/or other components of the flexible circuitry 62 may couple with the PCB 66 (e.g., via the flexible circuitry 62 or via wires embedded therein), which receives data from the sensors and/or the other components for processing.

The PCB 66 of the electrical components 56, as described above, may be utilized to receive data relating to operating conditions (e.g., temperature and voltage) of the battery module 20 (e.g., of FIG. 3), and to process or otherwise interpret the data. The shields 64 of the electrical components 56 may be utilized to block gases vented from electrochemical cells 32 of the battery module 20 (e.g., the cells 32 shown in FIG. 3) from negatively impacting the battery module 20. The shunt 68 of the electrical components 56 may be utilized in conjunction with the bus bars 50 to electrically couple the interconnected electrochemical cells 32 (e.g., of FIG. 3) with the module terminals 69 (e.g., major terminals) of the electrical components 56, which are utilized to couple the battery module 20 to the source receiving power from the battery module 20 (e.g., the vehicle). Further, in certain embodiments, the shunt 68 may be coupled to, or integral with (e.g., embedded in), the PCB 66. The relay 70 may be utilized, among other things, to control, monitor, or enable a complete disconnect from a load (e.g., the vehicle) which is provided a charge by the battery module 20. For example, the relay 70 may disconnect the battery module 20 from the load based on various operating conditions (e.g., temperature, voltage, or other conditions). It should be noted that other electrical components 56 associated with operation of the battery module 20 may also be received by the carrier 58 and, thus, included in the electrical unit 60.

In accordance with embodiments of the present disclosure, all the electrical components 56 shown in the illustrated embodiment may be received by, or mounted on, the illustrated carrier 58. For example, the carrier 58 may include integral guide extensions 80 configured to guide or receive the electrical components 56 to the appropriate locations on the carrier 58 (and with respect to their final positioning in the battery module [e.g., the battery module 20 of FIG. 3]). The illustrated guide extensions 80 may be integrally formed with the carrier 58. Further, the guide extensions 80 may be extensions that enable snap-fitting the electrical components 56 therein. For example, the guide extensions 80 may be positioned relative to one another and include features [e.g., recesses, projections] to enable one or more of the electrical components 56 to "snap-in" to place on the carrier 58. It should be noted, however, that the electrical components 56 may be otherwise disposed on the carrier 58. For example, the electrical components 56 may be adhesively coupled with the carrier 58, partially embedded in the carrier 58, fastened to the carrier 58, or otherwise coupled to the carrier 58.

Also, as shown, the carrier 58 may include openings 81 throughout the carrier 58. The openings 81 may be included and so positioned such that the electrical components 56, or the components (e.g., that are not included in the electrical unit 60) to which the electrical components 56 couple, may extend through the openings 81 to facilitate coupling. For example, the bus bars 50 may extend through the openings 81 to couple to the terminals of the electrochemical cells (e.g., the terminals 52 of the electrochemical cells 32 in FIG. 3). In some embodiments, the terminals of the electrochemical cells (e.g., the terminals 52 of the electrochemical cells 32 in FIG. 3) may extend through the openings 81 to couple to the bus bars 50.

Focusing on the embodiment illustrated in FIG. 4, the carrier 58 may include a first portion 82 and a second portion 84 proximate to the first portion 82. The carrier 58 may be initially positioned such that both the first portion 82 and the second portion 84 generally face the same direction (e.g., facing upwardly in direction 42 in the illustrated embodiment) and arranged in substantially the same plane. Accordingly, all the electrical components 56 may be disposed or mounted onto the first and second portions 82, 84 of the carrier 58 from a single position (e.g., from above the carrier 58), or from a reduced number of positions compared to traditional configurations. As shown, the first portion 82 and the second portion 84 may be joined by a flexible region 86 flexibly connecting the first portion 82 and the second portion 84. The flexible region 86 may include a component that is not integral with the first or second portions 82, 84 of the carrier 58, or the first portion 82, the second portion 84, and the flexible region 86 may all be integrally formed as a single structure (e.g., as shown). For example, the flexible region 86 may be a hinged connection including a separate pivot about which the first and second portions 82, 84 are coupled, or the flexible portion 86 (e.g., a living hinge) may be a grooved, thinned, or angled cut-out or edge integral to the carrier 58 and separating the first portion 82 from the second portion 84. In general, the flexible region 86 is configured to enable the first portion 82 to turn, flex, or otherwise rotate relative to the second portion 84 (or, put differently, to enable the second portion 84 to turn, flex, or otherwise rotate relative to the first portion 82).

Accordingly, while the electrical components 56 may be disposed onto the carrier 58 from a single position (or reduced number of positions compared to traditional configurations), the first portion 82 and the second portion 84 may be maneuvered relative to one another during installment of the electrical unit 60 into the battery module (e.g., the battery module 20 of FIG. 3), such that the first and second portions 82, 84 (and corresponding electrical components 56) are appropriately positioned within the battery module 20. Indeed, in FIG. 3, the first portion 82 of the carrier 58 is bent substantially perpendicular to the second portion 84 of the carrier 58 (e.g., about the flexible region 86), such that when the electrical unit 60 having the carrier 58 and the electrical components 56 is installed into the battery module 20, the first portion 82 is disposed along a first face of the battery module 20 (e.g., over the terminals 52 of the electrochemical cells 32 in FIG. 3), while the second portion 84 is disposed along a second face of the battery module 20 (e.g., perpendicular to the first face, or along sidewalls 90 of the electrochemical cells 32 in FIG. 3).

Figure 5:
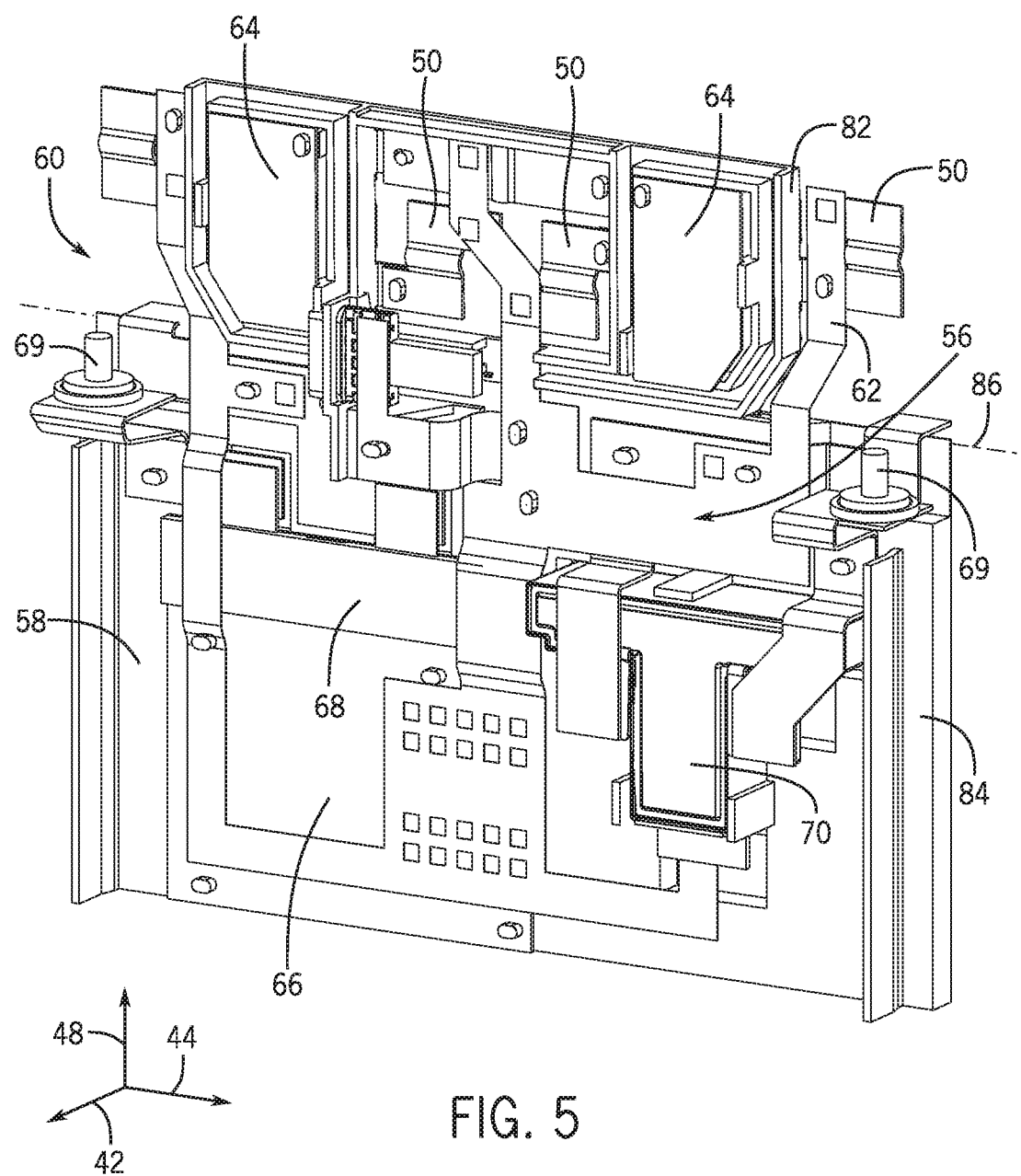
FIG. 5 is a perspective view of an embodiment of the electrical unit in FIG. 4, in accordance with an aspect of the present disclosure.
Figure 6:
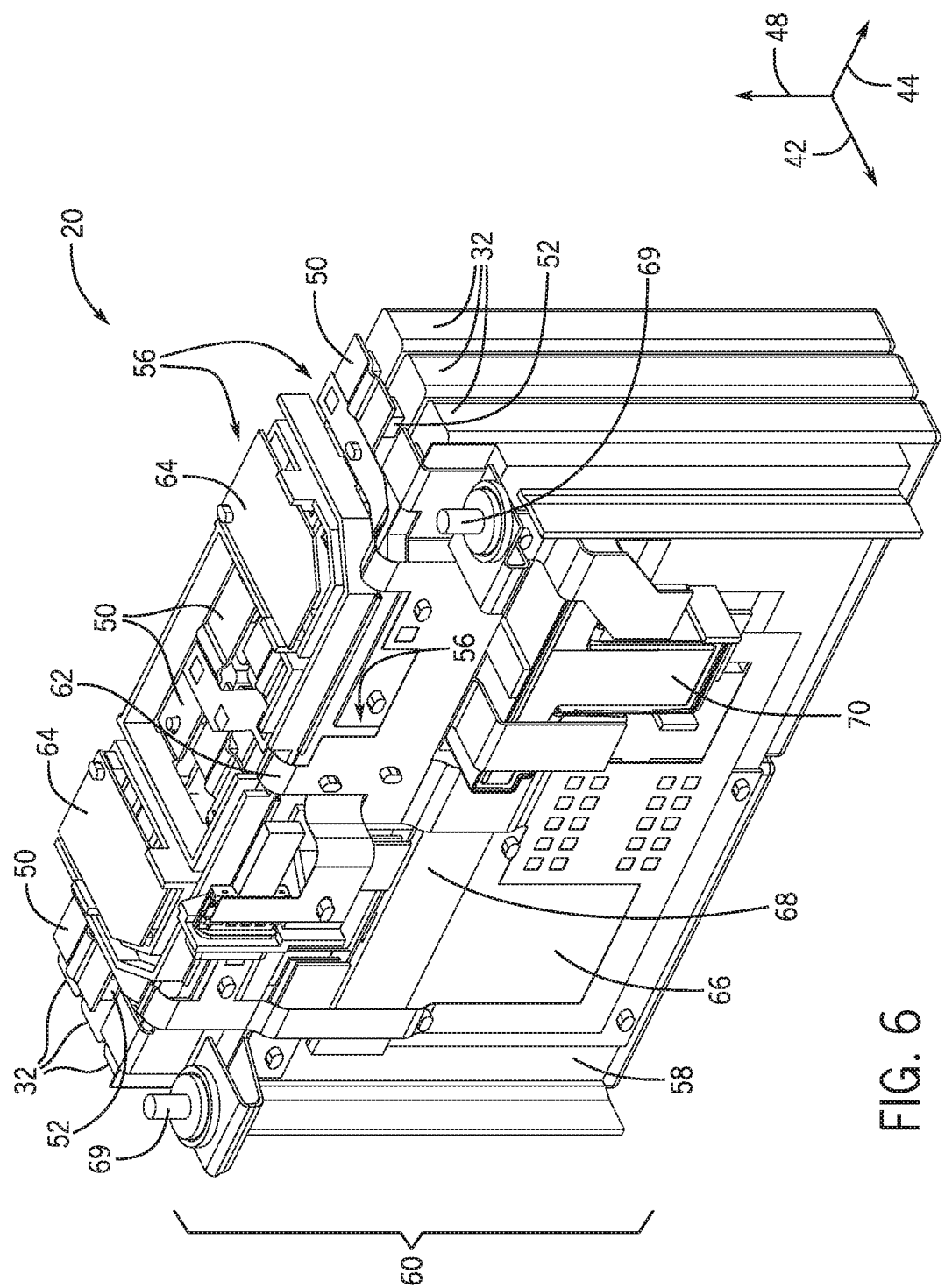
FIG. 6 is a perspective view of an embodiment of electrochemical cells and the electrical unit being used in the battery module of FIG. 3, in accordance with an aspect of the present disclosure.

By including the flexible region 86 in accordance with the description of the carrier 58 above, manufacturing of the electrical unit 60 is simplified. Indeed, all electrical components 56 may be disposed onto the carrier 58 from a single position (or reduced number of positions) above the carrier 58. For example, a perspective view of an embodiment of the electrical unit 60 (e.g., prior to bending the first portion 82 of the carrier 58 relative to the second portion 84 of the carrier 58 about the flexible region 86) having the electrical components 56 disposed onto the carrier 58 is shown in FIG. 5. Further, since all the electrical components 56 are disposed on a single, integrally formed carrier 58, wasted space in the battery module 20 is reduced, thereby increasing energy density of the battery module. For example, a perspective view of a combination of the electrochemical cells 32 and the electrical unit 60 having the carrier 58 and the electrical components 56 is shown in FIG. 6. As shown, little to no space is wasted in the illustrated embodiment.

As described above with reference to FIGS. 4 and 5, the flexible region 86 of the carrier 58 may be integrally formed with the first and second portions 82, 84 of the carrier 58. In other words, the carrier 58 may be one single, integrally formed structure. A perspective view of a portion of an embodiment of the flexible region 86 of the carrier 58 of the partially assembled electrical unit 60 of FIG. 5 is shown in FIG. 7. In the illustrated embodiment, the flexible region 86 is a grooved or curved (e.g. partial U-shaped) surface. As the first portion 82 is turned about the flexible region 86 (e.g., in annular direction 99), the curved (e.g., partial U-shaped) surface may straighten or flatten, enabling the turning of the first portion 82 and the second portion 84 relative to one another.

Figure 9:
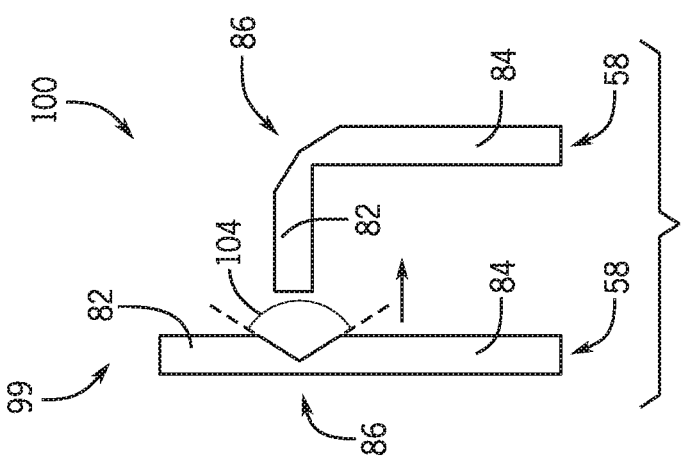
FIG. 9 is a schematic side view of an embodiment of a flexible region of a carrier, in accordance with an aspect of the present disclosure.
Figure 8:
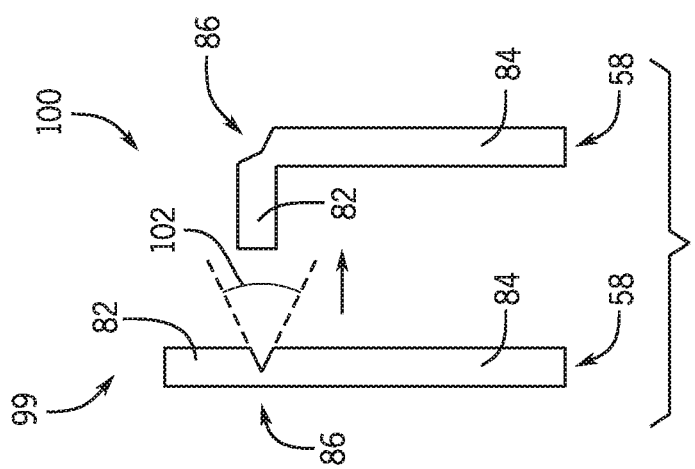
FIG. 8 is a schematic side view of an embodiment of a flexible region of a carrier, in accordance with an aspect of the present disclosure.

It should be noted that other embodiments of the flexible region 86 may also be employed. For example, instead of the embodiment illustrated in FIG. 7, an angled cut-out may be employed in a relatively thick piece of material. A schematic side view of an embodiment of the carrier 58 having an angled cut-out for the flexible region 86 is shown in FIG. 8 transitioning from a first orientation 99 to a second orientation 100 (e.g., L-shape). In the illustrated embodiment, the angled cut-out (e.g., the flexible region 86) includes an acute angle 102 prior to turning the first portion 82 relative to the second portion 84. After turning the first portion 82, the angle may increase (in the second orientation 100). A schematic side view of an embodiment of the carrier 58 having a different angled cut-out for the flexible region 86 is shown in FIG. 9. In the illustrated embodiment, the angled cut-out (e.g., the flexible region 86) includes an obtuse angle 104 prior to turning the first portion 82 relative to the second portion 84 (in the first orientation 99). After turning the first portion 82, the angle may increase (in the second orientation 100). It should be noted that the flexible regions 86 in FIGS. 7-9 may be referred to as "hinges" insomuch as they are movable joints about which one or both of the first or second portions 82, 84 of the carrier 58 may turn. It should also be noted that these hinges may be rotated in the opposite direction shown. In such a case, the notches or cut outs may limit rotation based on the respective angles 102, 104.

Figure 10:
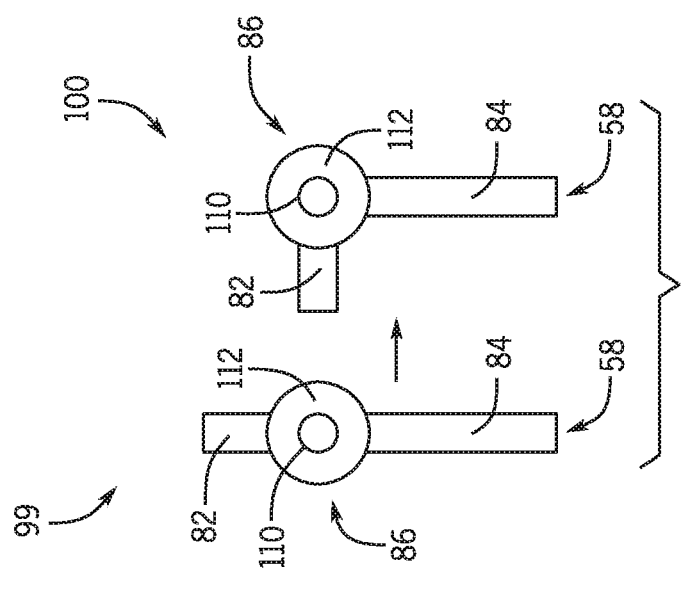
FIG. 10 is a schematic side view of an embodiment of a flexible region of a carrier, in accordance with an aspect of the present disclosure.

It should also be noted that, in some embodiments, the flexible region 86 may include a component that is not integral with the carrier 58, and/or that the first and second portions 82, 84 may not be integrally formed. For example, the first portion 82 of the carrier 58 may be separate from the second portion 84 of the carrier 58, and the first and second portions 82, 84 may be coupled with one another via a separate component at the flexible region 86. A schematic side view of an embodiment of the flexible region 86 of the carrier 58 is shown in FIG. 10, where the flexible region 86 includes a component that is not integral to the carrier 58. For example, the illustrated flexible region 86 is a hinge having a pivot 110 about which both the first and second portions 82, 84 of the carrier 58 are coupled. The pivot 110 may be a cylindrical bar that is received by hollow cylindrical receptors 112 of the first and second portions 82, 84. Only the hollow cylindrical receptor 112 of the second portion 84 of the carrier 58 is shown in the illustrated embodiment, as the corresponding receptor of the first portion 82 is hidden by the hollow cylindrical receptor 112 of the second portion 84 due to the side view. It should be noted that the present disclosure is intended to include other types of hinges suitable for the disclosed purpose of turning portions of the carrier 58 relative to one another.

It should be noted, in accordance with present embodiments, that features may be included to fix the carrier 58 in place in the second orientation 100. For example, the carrier 58 may be fixed in the second orientation 100 via snap-fit members disposed on a portion of the carrier 58, on a portion of the housing 30 (e.g., in FIG. 3), on one or more of the electrochemical cells 32 (e.g., in FIG. 3), or on a combination thereof. For example, after (or while) positioning the carrier 58 in the second orientation 100, the first portion 82 (or features thereof) may snap into snap-fit members disposed on the second portion 84 of the carrier 58, on the housing 30 (e.g., in FIG. 3), on the electrochemical cells 32 (e.g., in FIG. 3), or on a combination thereof. Additionally or alternatively, the second portion 84 (or features thereof) may snap into snap-fit members disposed on the first portion 82 of the carrier 58, on the housing 30 (e.g., in FIG. 3), on the electrochemical cells 32 (e.g., in FIG. 3), or on a combination thereof. Additionally or alternatively, the carrier 58 may be welded or adhesively bonded in place in the second orientation 100. For example, the first portion 82 and/or the second portion 84 of the carrier 58 may be welded (or adhesively bonded) to the other of the second portion 84 and/or the first portion 82, to the housing 30 (e.g., in FIG. 3), to the electrochemical cells 32 (e.g., in FIG. 3), or to a combination thereof. Further still, in some embodiments, the carrier 58 may be fixed in the second orientation 100 by welding, or applying a bonding agent (or some other stiffening agent), to the flexible region 86 after the first portion 82 is turned relative to the second portion 84 to position the carrier 58 in the second orientation 100.

Figure 11:
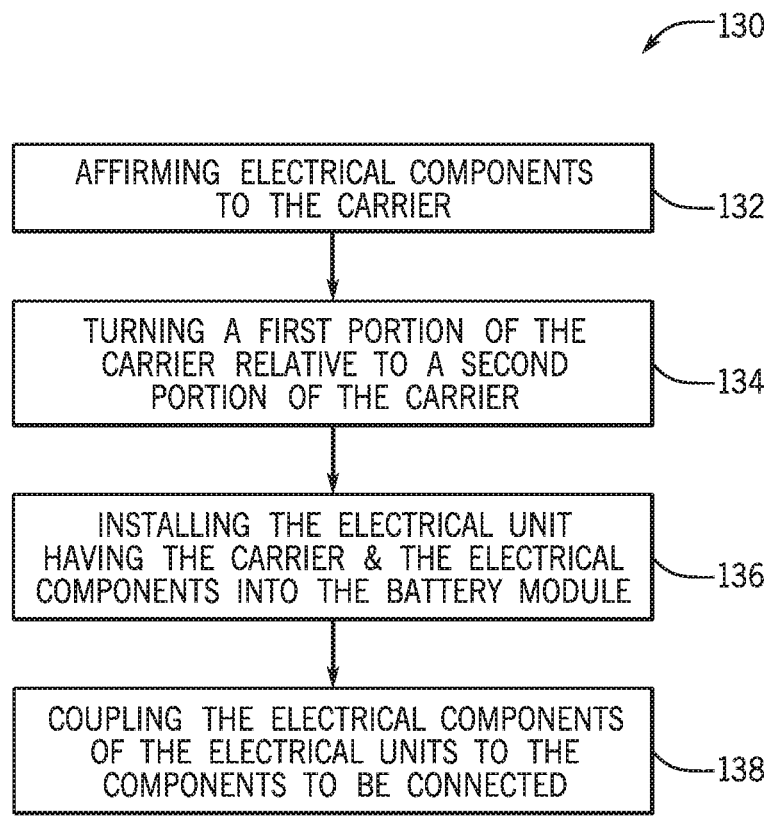
FIG. 11 is a process flow diagram of an embodiment of a method for manufacturing the electrical unit of FIG. 4, in accordance with an aspect of the present disclosure.

A process flow diagram illustrating an embodiment of a method 130 of manufacturing the battery module 20 of FIG. 3 is shown in FIG. 11. In the illustrated embodiment, the method 130 includes affixing (block 132) electrical components to a non-conductive carrier of the battery module. For example, as previously described, the non-conductive carrier may include guide extensions that receive the electrical components. The electrical components may be guided into place by the guide extensions, or the electrical components may snap-fit into place between guide extensions. Additionally or alternatively, the electrical components may be affixed to the carrier via adhesive, fasteners, or other coupling mechanisms. It should be noted that the electrical components may be positioned onto the carrier from a single position above the carrier, which may be laid flat or such that the portions of the carrier on which the electrical components are disposed face substantially the same direction.

The method 130 also includes rotating or turning (block 134) a first portion of the carrier relative to a second portion of the carrier. For example, as previously described, the carrier includes a flexible region (e.g., hinge) between the first and second portions of the carrier. The first portion may be rotated about the flexible region relative to the second portion, or vice versa. The first portion may be rotated, for example, 90 degrees relative to the second portion such that the first portion is perpendicular to the second portion.

The method 130 also includes installing (block 136) the electrical unit having the carrier and the electrical components into the battery module. For example, the electrical unit may be positioned within a housing of the battery module such that the electrical components are aligned with the components (of the battery module) to be connected. For example, the first portion of the carrier may be disposed over terminals of the electrochemical cells of the battery module, and the second portion of the carrier (e.g., perpendicular to the first portion)

The method 130 also includes coupling (block 138) the electrical components of the electrical unit to the components (of the battery module) to be connected. For example, as previously described, the electrical components of the electrical unit may include bus bars, flexible circuitry, a relay, a PCB, and battery module terminals (e.g., major terminals), among others. Certain of the components (e.g., the bus bars) may be disposed on the first portion (e.g., first face) of the carrier of the electrical unit, and may be configured to couple with components (e.g., minor terminals of the electrochemical cells) that are not included in the electrical unit. After positioning the electrical unit into the housing of the battery module, the bus bars may be coupled with the appropriate terminals (e.g., minor terminals) of the appropriate electrochemical cells of the battery module.

One or more of the disclosed embodiments, alone or in combination, may provide one or more technical effects useful in the manufacture of battery modules, and portions of battery modules. In general, embodiments of the present disclosure include a battery module having an electrical unit that includes a non-conductive carrier and electrical components (e.g., electrical connecting components) configured to be disposed thereon. While mounting the electrical components onto the carrier, the carrier may be laid flat such that the electrical components are disposed onto the carrier from a single position. However, the carrier may include a flexible region that enables turning of a first portion of the carrier relative to a second portion of the carrier. Accordingly, while manufacturing of the electrical unit is simplified, installment of the electrical unit into the battery module is also simplified, and a space utilized by the electrical unit is reduced. Thus, energy density of the battery module is increased, and manufacturing of the battery module is simplified. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure

The invention claimed is:

1. A battery module, comprising:
an electronics carrier configured to receive electrical components;
a housing having a first face and a second face different than the first face, wherein the electronics carrier is disposed in the housing;
one or more stacks of electrochemical cells, disposed in the housing, the one or more stacks of electrochemical cells comprising a first face substantially parallel to the first face of the housing and a second face substantially parallel to the second face of the housing;
wherein the electronics carrier is electrically insulative and comprises a first portion configured to receive a first plurality of electrical components, a second portion configured to receive a second plurality of electrical components, the first portion and the second portion together by a flexible region in physical contact with each of the first portion and second portion and configured to enable the first portion to turn relative to the second portion, wherein in an installed state within the housing, the first portion corresponds with the first face of the housing extending in a first planar orientation and at least partially covers the first face of the one or more stacks of electrochemical cells and the second portion corresponds with the second face of the housing extending in a second planar orientation different from the first planar orientation and at least partially covers the second face of the one or more stacks of electrochemical cells.

2. The battery module of claim 1,
wherein the flexible region comprises a hinge.

3. The battery module of claim 1,
wherein the flexible region comprises a hinge having a pivot pin to which the first portion and the second portion of the electronics carrier are rotatably coupled.

4. The battery module of claim 1,
wherein the first portion, the second portion, and the flexible region are integrally formed with one another.

5. The battery module of claim 1,
wherein the first plurality of electrical components and the second plurality of electrical components are affixed to the electronics carrier such that, after the first portion is turned relative to the second portion, the first plurality of electrical components interfaces with a first plurality of connected components of the battery module and the second plurality of electrical components interfaces with a second plurality of connected components of the battery module.

6. The battery module of claim 5,
wherein the electronics carrier comprises a plurality of integral guide extensions configured to receive the first plurality of electrical components, the second plurality of electrical components, or both.

7. The battery module of claim 6,
wherein the electronics carrier comprises one or more openings through which the first plurality of electrical components, the second plurality of electrical components, the first plurality of connected components, the second plurality of connected components, or a combination thereof extend.

8. The battery module of claim 1,
wherein each electrochemical cell of the one or more stacks comprises at least one terminal configured to interface with the first plurality of electrical components, the second plurality of electrical components, or both.

9. The battery module of claim 1, comprising a printed circuit board (PCB) electrically coupled with the first plurality of electrical components, the second plurality of electrical components, or both.

10. The battery module of claim 1, comprising at least one battery module terminal electrically coupled with the first plurality of electrical components, the second plurality of electrical components, or both.

11. The battery module of claim 1,
wherein the flexible region comprises an angled cut-out or a groove of the electronics carrier between the first portion and the second portion, and
wherein the angled cut-out or groove is configured to enable the first portion to turn relative to the second portion.

12. An electrically insulative electronics carrier of a battery module, comprising:
a first portion configured to receive a first plurality of electrical connectors;
a second portion configured to receive a second plurality of electrical connectors; and a hinge portion joining the first portion with the second portion at a hinged connection, wherein the hinge portion is configured to enable the first portion to rotate relative to the second portion between an angled orientation and a planar orientation, wherein, in an angled orientation within a housing of the battery module, the first portion is configured to correspond with a first face of the housing of the battery module and to at least partially cover a first face of one or more stacks of electrochemical cells disposed in the housing of the battery module, the first face of the one or more stacks of electrochemical cells being substantially parallel to the first face of the housing, and the second portion is configured to correspond with a second face of the housing being different than the first face of the housing and to at least partially cover a second face of the one or more stacks of electrochemical cells, the second face of the one or more stacks of electrochemical cells being substantially parallel to the second face of the housing, and wherein the first portion and second portion are arranged in substantially the same plane prior to installation within the housing of the battery module.

13. The electrically insulative electronics carrier of claim 12, wherein the first portion, the second portion, and the hinge portion are one integral structure.

14. The electrically insulative electronics carrier of claim 13, wherein the hinge portion comprises a groove or an angled cut-out.

15. The electrically insulative electronics carrier of claim 14, comprising the angled cut-out, wherein the angled cut-out comprises an obtuse angle.

16. The electrically insulative electronics carrier of claim 12, comprising integral guide extensions configured to receive the first plurality of electrical connectors, the second plurality of electrical connectors, or both, wherein the integral guide extensions are positioned such that the first plurality of electrical connectors, the second plurality of electrical connectors, or both, when received by the integral guide extensions, are aligned with corresponding electrical components of the battery module.

17. A method of manufacturing a battery module comprising a housing having a first face and a second face different than the first face and one or more stacks of electrochemical cells disposed in the housing, the method comprising:

disposing a first plurality of electrical connectors on a first portion of an electronics carrier of the battery module;

disposing a second plurality of electrical connectors on a second portion of the electronics carrier, wherein the second portion of the electronics carrier is physically affixed to the first portion of the carrier by a flexible region of the electronics carrier, the first portion and second portion extending in a planar orientation;

turning the first portion of the electronics carrier relative to the second portion of the electronics carrier about the flexible region; and installing the electronics carrier into the housing of the battery module such that the first portion of the electronics carrier corresponds with the first face of the housing and at least partially covers a first face of the one or more stacks of electrochemical cells, the first face of the one or more stacks of electrochemical cells being substantially parallel to the first face of the housing, and the second portion of the electronics carrier corresponds with the second face of the housing and at least partially covers a second face of the one or more stacks of electrochemical cells, the second face of the housing being substantially parallel to the second face of the housing, and contacting the first plurality of electrical connectors with terminals of electrochemical cells of the battery module.

18. The method of claim 17, comprising coupling the second plurality of electrical connectors with electrical components of the battery module.

19. The method of claim 17, comprising turning the first portion of the electronics carrier relative to the second portion of the electronics carrier about the flexible region such that the first portion is substantially perpendicular with the second portion.

20. The battery module of claim 1, wherein the first plurality of electrical components is different from the second plurality of electrical components.

* * * * *

UNITED STATES PATENT AND TRADEMARK OFFICE
CERTIFICATE OF CORRECTION

| | |
|---|---|
| PATENT NO. | : 11,495,834 B2 |
| APPLICATION NO. | : 16/081836 |
| DATED | : November 8, 2022 |
| INVENTOR(S) | : Brenner et al. |

It is certified that error appears in the above-identified patent and that said Letters Patent is hereby corrected as shown below:

In the Claims

In Column 13, Line 64, in Claim 1, delete "together" and insert -- being held together --, therefor.

Signed and Sealed this
Ninth Day of April, 2024

Katherine Kelly Vidal
*Director of the United States Patent and Trademark Office*